United States Patent [19]

Boll et al.

[11] Patent Number: 5,563,724
[45] Date of Patent: Oct. 8, 1996

[54] COLOR-TO-INK TRANSFORMATION FOR EXTRA-QUARTERNARY PRINTING PROCESSES

[75] Inventors: Harold Boll, Winchester; Scott Gregory, Bedford, both of Mass.

[73] Assignee: Eastman Kodak Company, Rochester, N.Y.

[21] Appl. No.: 327,243

[22] Filed: Oct. 21, 1994

[51] Int. Cl.$^6$ ................ H04N 1/46; B41J 2/21
[52] U.S. Cl. .............. 358/502; 358/500; 358/515; 358/518; 347/43
[58] Field of Search ................ 358/500, 515, 358/518, 520, 523, 529, 533, 539, 502, 503, 504; 347/43, 115, 172, 232; 101/335, DIG. 29; H04N 1/46

[56] References Cited

U.S. PATENT DOCUMENTS

| | | | |
|---|---|---|---|
| 4,670,780 | 6/1987 | McManus et al. | 358/518 |
| 4,812,899 | 3/1989 | Kueppers | 358/75 |
| 5,231,504 | 7/1993 | Magee | 358/520 |
| 5,243,414 | 9/1993 | Dalrymple et al. | 358/518 |
| 5,282,046 | 1/1994 | Yamaguchi | 358/296 |
| 5,299,291 | 3/1994 | Ruetz | 395/109 |
| 5,343,311 | 8/1994 | Morag et al. | 358/518 |
| 5,450,216 | 9/1995 | Kasson | 358/518 |
| 5,463,480 | 10/1995 | MacDonald | 358/520 |
| 5,500,921 | 3/1996 | Ruetz | 395/109 |

OTHER PUBLICATIONS

Maureen C. Stone, Color Gamut Mapping & The Printing of Digital Color Images, ACM Transactions on Graphics, vol. 7, No. 4, Oct. 1988, pp. 249–292.

Primary Examiner—Kim Yen Vu
Assistant Examiner—Madeleine Anh-Vinh Nguyen
Attorney, Agent, or Firm—Raymond L. Owens

[57] ABSTRACT

A process is provided for creating an inktable from a superset of n inks by subdividing the n inks into k subsets of ink groupings, where any given subset contains $m_j$ number of inks selected from the superset of n inks; where the subscript j denotes a particular subset (the j-th subset) in the overall set of k subsets and whose range is $1 \leq j \leq k$. The process includes the steps of generating a multiple-color target of color patches for each of a series of k inksets; deriving colorimetric data for each multiple-color target by measuring the color patches; constructing a plurality of forward models which respectively relate ink-to-color for each of the k inksets; constructing a subgamut from each forward model; constructing a supergamut from the union of all subgamuts; compressing out-of-gamut colors to the supergamut to thereby map out-of-gamut colors to printable colors which are within or at the surface of the supergamut; for a given color, attempting to invert the forward model of all k inksets in order to obtain an inking; generating a predicted inking from previous points on path in colorspace; selecting a final inking from set of successful inversions which represent the closest match to the predicted inking.

17 Claims, 12 Drawing Sheets

| DOMINANT INK | NAME |
|---|---|
| YELLOW | GYRK |
| RED | YRMK |
| MAGENTA | RMBK |
| BLUE | MBCK |
| CYAN | BCGK |
| GREEN | CGYK |

| FORWARD MODEL ERROR STATISTICS |||
|---|---|---|
| FORWARD MODEL | MAXIMUM DELTA-E AB | STANDARD DEVIATION |
| GYRK | 6.82 | 2.02 |
| YRMK | 7.10 | 2.14 |
| RMBK | 6.28 | 0.79 |
| MGCK | 5.20 | 0.78 |
| BCGK | 4.82 | 0.66 |
| CGYK | 5.76 | 1.88 |

COLOR-TO-INK TRANSFORMATION FOR EXTRA-QUARTERNARY PRINTING PROCESSES

BACKGROUND OF THE INVENTION

1. Technical Field

This invention relates generally to the creation of a bi-directional color transform between a color specification in a CIE-derived color space and device control values for extra-quaternary inking processes so that (i) colors can be predicted from a set of ink control values; and (ii) given a desired color, the device control values of a subset of inks derived from the original set of inks can be specified which achieve that desired color.

2. Background Art

As Desktop Color Publishing Systems become more ubiquitous, 4-color CMYK (cyan, magenta, yellow, black) printing has become a commodity item. Consequently the technical community is being driven by the high-end color market to develop new printing technologies to differentiate and add value to their product. The intent is to produce images of superior color, tone and detail than is obtainable with traditional processes. One approach to obtaining more colorful images is by employing more than 4 inks as process inks; in short, extra-quaternary printing processes.

Augmenting a set of CMYK inks with additional inks increases the gamut of printable colors. In any printing process, colors tend to become darker as more ink is laid down on paper because of the subtractive interaction of ink and incident light. The lighter hues of red, green and blue are consequently difficult to achieve with the traditional set of CMYK primary inks since they are produced from 2-ink overprints of the primaries. These lighter hues can be obtained by single inks properly formulated to the desired hue. Additional inks tend to increase the color gamut in the darker tonal regions as well. Their presence chromatically expands the entire gamut up and down the tonal range. The quarter tones and 3 quarter tones are especially augmented.

U.S. Pat. No. 4,812,899, which issued to Harold Kueppers on Mar. 14, 1989, discloses a scheme for creating 7-ink color separations based on an empirical algorithm which converts an additive interpretation of an RGB encoding of the source color to a set of specially formulated CMYKRGB colorants. Each color is inked with a maximum of 3 inks: all colors contain black; another ink is selected from the negative set of CMY primaries, cyan, magenta, and yellow; and the final chromatic ink is selected from the positive set of primaries RGB, red, green, and blue. In this context the terms 'positive' and 'negative' are being used as labels and are not meant to suggest that the subtractive colorimetry of the 2 inksets differ in any fundamental way. This approach has significant advantages for conventional halftoning technology: with just 3 inks per color, there are no moiré concerns in printing. However, being empirical in nature implies that it is not colorimetrically based. There is no mechanism present to ensure that colors specified in the units of a CIE derived colorspace can be achieved with this inking scheme.

DISCLOSURE OF THE INVENTION

It is an object of the present invention to provide a process which produces an inktable which generates n separations, where n is greater than 4, for extra-quaternary printing processes.

It is another object of the present invention that it is uniquely capable of exploiting all of the attainable color gamut afforded by an n-ink (n>4) printing process and thereby achieves maximum colorfulness for rendered colors.

It is another object of the present invention to produce a colorimetrically based color-to-ink transform in which for any input color specification, the output is a subset of inks which are derived from the set of n inks. For colors which are in the color gamut of the n inks, the returned inkings represent a colorimetric match to that color when printed and viewed under specified conditions. For colors which are outside the gamut of the n inks, the returned inkings represent the closest attainable color in the metric of the colorspace with respect to the n ink color gamut.

According to these and other objects, the present invention provides a process, starting with a specified color in a CIE derived colorspace, for rendering an inking for that color with a subset of inks selected from a said set of n inks where n is an integer greater than 4; said process comprising the steps of:

subdividing the set n inks into k subsets of ink groupings wherein k is an integer less than n;

any Given subset contains $m_j$ number of inks selected from the superset of n inks; where the subscript j denotes a particular subset (the j-th subset) in the overall set of k subsets and whose range is: $1 \leq j \leq k$;

characterizing a transformation from inkings to color for each of the k ink subsets; and generate an inking derived from one of the k ink subsets containing $m_j$ inks, such that the inking is a colorimetric match to the specified color for colors within the n ink gamut or represents the closest color in the metric of the input colorspace for colors outside of the n ink color gamut.

The process entails creating k subsets of ink groupings obtained from a superset of n inks. Any given subset will contain $m_j$ number of inks; where the subscript j denotes a particular subset (the j-th subset) in the overall set of k subsets and whose range is: $1 \leq j \leq k$. The process includes the steps of generating a multiple-color target of color patches for each of the k ink subsets, any given subset containing $m_j$ number of inks; obtaining colorimetric data for each multiple-color target by measuring the color patches; constructing a plurality of forward models which respectively relate inking-to-color for each of the k ink subsets; constructing a subgamut from each forward model; constructing a supergamut from the union of all subgamuts; map out-of-gamut colors to printable colors which are within or at the surface of the supergamut; for a given color, attempt to invert the forward model of all k ink subsets; and, finally, select the final inking from the set of successful inversions based on appropriate selection criteria.

In a preferred embodiment of the present invention, the number of inks is equal to 7 (n=7); the number of ink subsets is 6 (k=6); each ink subset contains 4 inks ($m_j$=4 for j=1 to 6); the ink colors themselves are cyan, magenta, yellow, black, red, green and blue; the color is specified in the units of a CIE derived colorspace.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 4A shows the top 64 planes at constant L*;

BEST MODE FOR CARRYING OUT THE INVENTION

Figures 1, 2, 3:
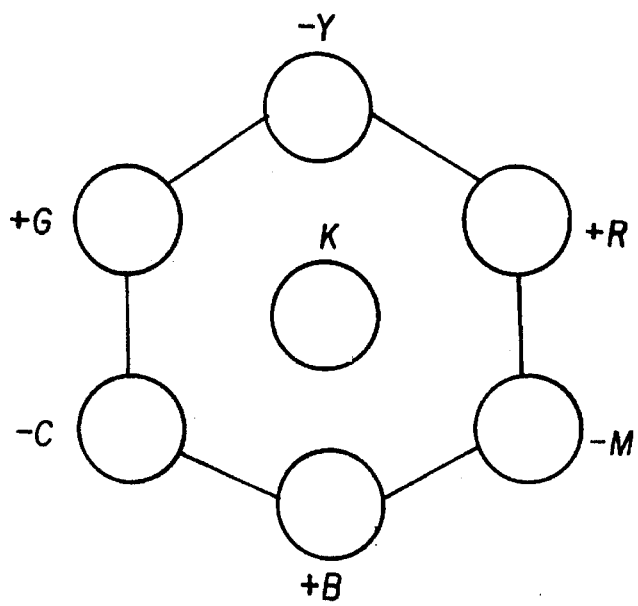
FIG. 1 is a table of 6 4-ink groupings for the generation of color targets according to the present invention.
FIG. 2 is a depiction of a color hexagon wherein each positive primary color has a complementary negative primary color opposite it.
FIG. 3 is a table of error statistics for a forward model in accordance with the present invention.

The present description will be directed in particular to elements forming part of, or cooperating more directly with, apparatus in accordance with the present invention. It is to be understood that elements not specifically shown or described may take various forms well known to those skilled in the art.

An inktable is a 3-dimensional look-up table which generates actual color separations. It accepts image data as input and outputs percentage dot ink values. A robust inktable will produce halftone separations which are smooth, free of artifacts and show sensible usage of the ink primaries. The grid points of the inktable are populated using a color-to-ink transform.

The characterization of a 7-ink process introduces complexities not encountered in the well understood characterization of CMYK inks. For example, in a CMYK process, there is a gray component equivalency between black ink and nearly equal amounts of cyan, magenta, and yellow inks. This means there may be many combinations of cyan, magenta, yellow, and black which produce the same color. Typically, GCR/UCR settings and aim curves are utilized to constrain the problem and select a particular CMYK in a manner which ensures robust inktable characteristics. This approach becomes inadequate when 3 additional inks are added to the mix because the notion of gray component equivalency becomes ambiguous in this context. Other concerns include printability, smoothness of ink transitions and modeling of a 7-dimensional space.

According to the present invention, the evident complexity of 7-ink characterization is reduced by decomposing it into 6 sets of 4-ink groupings. Each set of 4 inks is then characterized as rigorously as a conventional CMYK inkset. In color space, these 4-ink groupings represent adjacent and overlapping subgamuts of the 7-ink supergamut.

The final solution in obtaining a color-to-colorant transform and populating an inktable is based on utilizing these separate characterizations both singly and in concert with one another. Accordingly, the problem reduces to deciding which of the 4-ink characterizations to utilize in generating an inking for a given color. This approach results in the construction of an inktable in which each color is inked with a maximum of 4 inks. As will be fully explained below, 4 inks per color is believed to be optimal with respect to full utilization of the color gamut obtainable with 7 inks.

The series of steps which enable this process are as follows:

(a) subdivide the set of 7 inks into 6 subsets, each containing 3 chromatic inks plus black ink;

(b) generate 6 color targets, one from each 4-ink subset;

(c) measure color patches in each target to obtain paired colorimetric data and command values;

(d) construct a forward model which relates ink to color for each 4-ink subset;

(e) construct a subgamut from each forward model;

(f) construct a supergamut from union of all subgamuts;

(g) compress out-of gamut colors to the supergamut;

(h) for a given color, attempt to invert forward models of all 6 inksets; and (i) select final inking from set of successful inversions employing appropriate selection criteria.

Color Targets

The first step in the 4-ink characterization process of the present invention is the generation of a set of 6 color targets, each comprised of 4 inks as shown in FIG. 1. Each target consists of 625 patches which represent all combinations of 4 inks varying in 5 values equally spaced over the percent-dot range of 0% dot to 100% dot. Each 4-ink grouping contains black and a set of either positive-negative-positive primary chromatic inks or negative-positive-negative primary chromatic inks. The central primary of a grouping can be appropriately referred to as the "dominant" primary since it tends to be present to a greater degree than the other two in the overall inking of colors contained within its gamut.

The rationale for this particular grouping of inks can be understood by referring to the color hexagon shown in FIG. 2. Each positive primary color has its complementary negative primary color placed opposite it. It also represents the circular ordering of hues about neutral on a chromaticity plot. Each 4-ink grouping differs by only 1 ink from an adjacent grouping. This maximizes the likelihood that the entire set of 6 targets constitute a reasonable sampling of all colors achievable with 7 inks.

Measurement

The next step in accordance with the process of the present invention is to measure the spectral reflectance values of patches in all 6 color targets. In a preferred reduction to practice, measurements were obtained by using a Photo Research spectrophotometer. Measurements were performed at a 45/0 measuring geometry. Samples were taken over the range of 390 nm to 722 nm at 4 nm intervals. Tristimulus values were computed by folding in the spectrum of the fluorescent $D_{50}$ light source of the viewing booth used.

Forward Model

For each color target, there is a 625 entry table relating a 4-component inking to a color (tristimulus value). The color patch sampling in 4-dimensional output color space is thus quite sparse. The forward model is a mathematical construct whose purpose is to relate any possible 4-ink specification, over the normalized range of 0 to 1 in each channel, to its colorimetric value. The forward model establishes an analytical relationship in a given direction from ink to color. It can be obtained by fitting the experimental data to the parameters of a suitable basis function.

Figure 5:
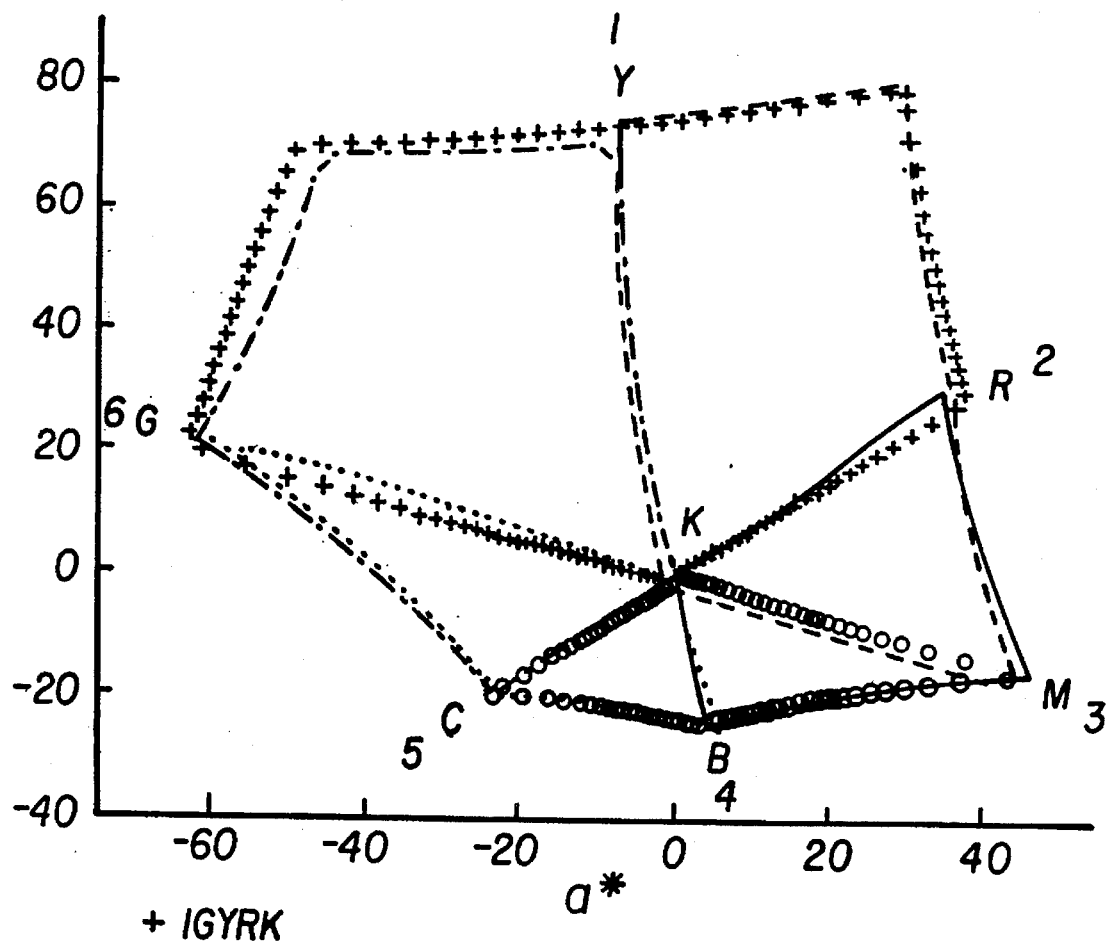
FIG. 5 is a cross-section of a supergaumut at L*=75 with constituent subgaumuts shown.

The error statistics shown in FIG. 3 are representative of well behaved printing processes. They were computed by comparing the experimentally measured colors of the patches against values computed by the forward model. As explain below, the alignment of subgamut boundaries as shown in FIG. 5 lends further credence to the integrity of the measurement and modeling steps in the overall characterization process.

Subgamuts

Figure 4A:
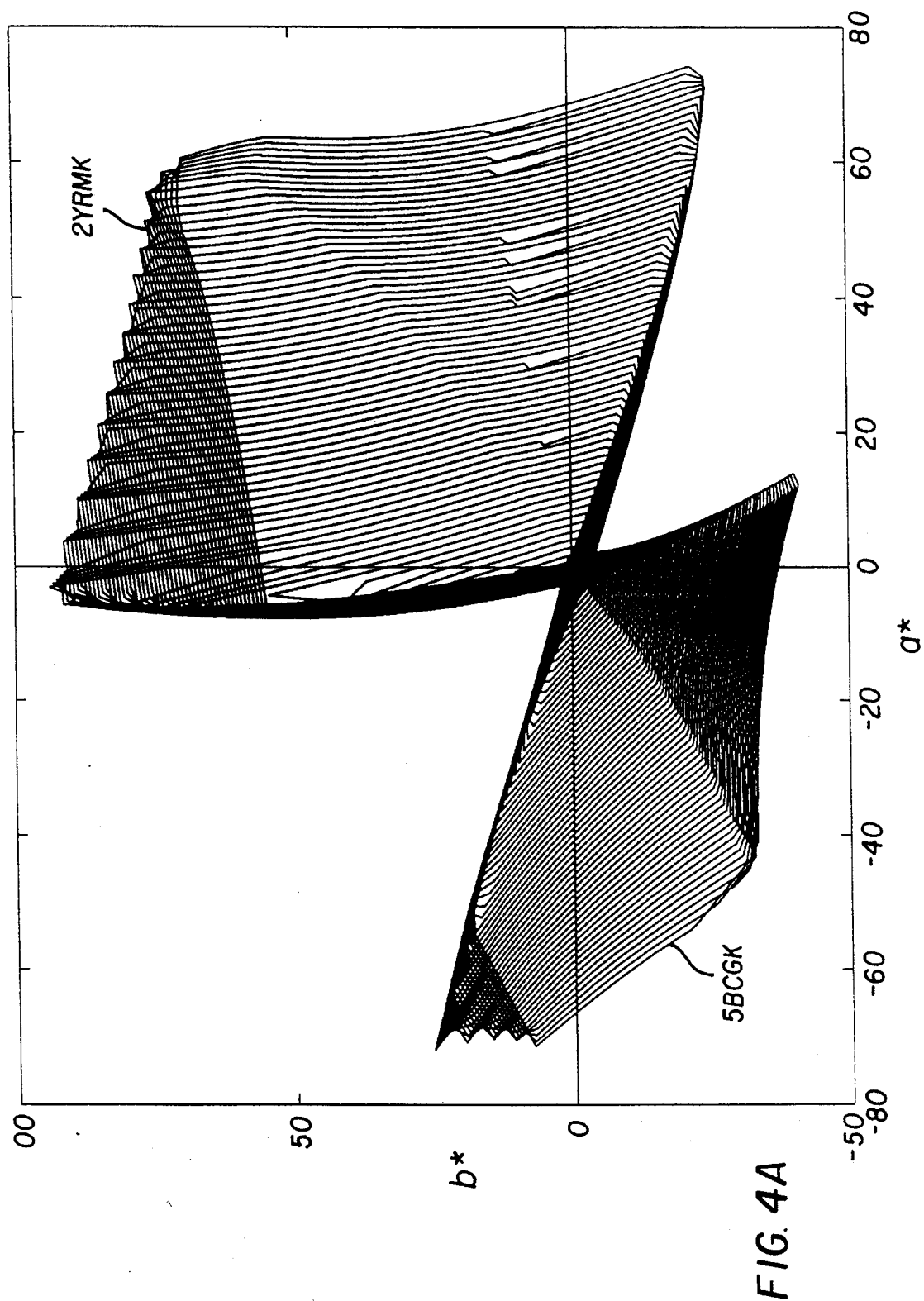
FIGS. 4A and B are a stacked plot view of complementary cyan and red subgaumuts constructed in accordance with the present invention.
Figure 4B:
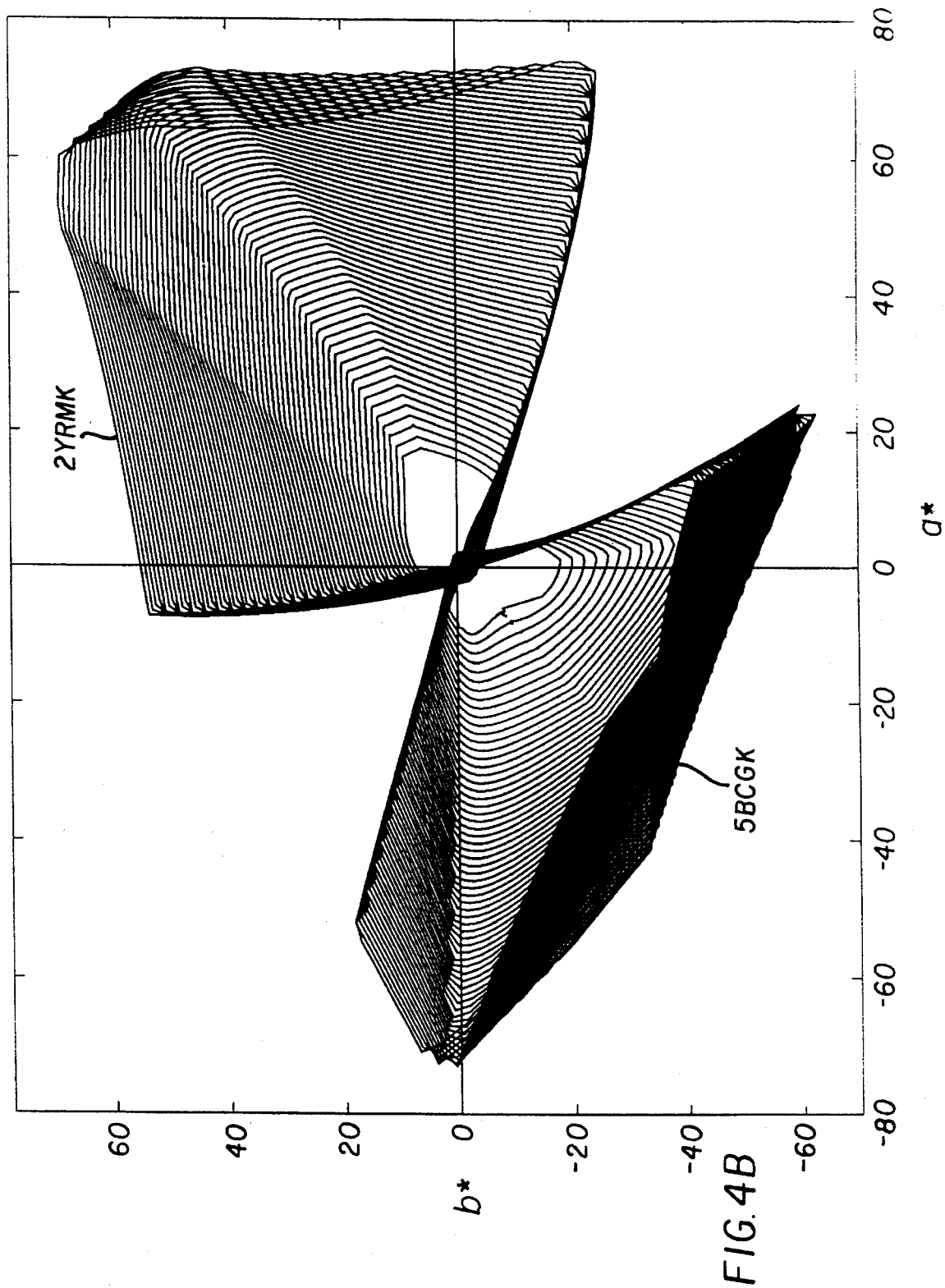
FIG. 4B shows the bottom 64 planes at constant L*.

A separate gamut is constructed for each of the 6 forward models. The gamut construction process is preferably performed in CIELAB and entails quantizing the available L* tonal range into 128 levels. The gamut boundary at each L* level is defined by 128 points. Each gamut represents that volume of color space swept out by the forward model when all combinations of its 4 input values (inks) are fed in. Each gamut is a portion of the overall 7-ink supergamut and thus can be referred to as a subgamut. Adjacent subgamuts differ by only 1 chromatic ink and have 2 chromatic inks plus black ink in common. This results in a high degree of overlap between adjacent subgamuts. The naming convention adopted for referring to subgamuts is either by the dominant ink or by the 4-ink label specified in FIG. 1. FIGS. 4A and 4B show a stacked plot view of the top and bottom halves of the cyan and red subgamuts which are well separated from one another in CIELAB color space. FIG. 5 shows how the entire set of subgamuts overlap extensively.

The gamut construction process is performed in CIELAB and entails quantizing the available L* range into 128 levels. For each L* level, the hue angle is also quantized into 128 bins. For a given quantized L* and hue value, the optimization routine, driven by the forward model, finds the color of greatest chroma which represents the gamut boundary at that position. Both the CIELAB color and the inking which achieved that color are then stored. As a data object, a gamut provides several important functions:

(a) it explicitly defines the position of the color boundary in CIELAB all along the tonal range; and (b) it determines whether a given color is in or out of the gamut.

Supergamut

Figure 6:
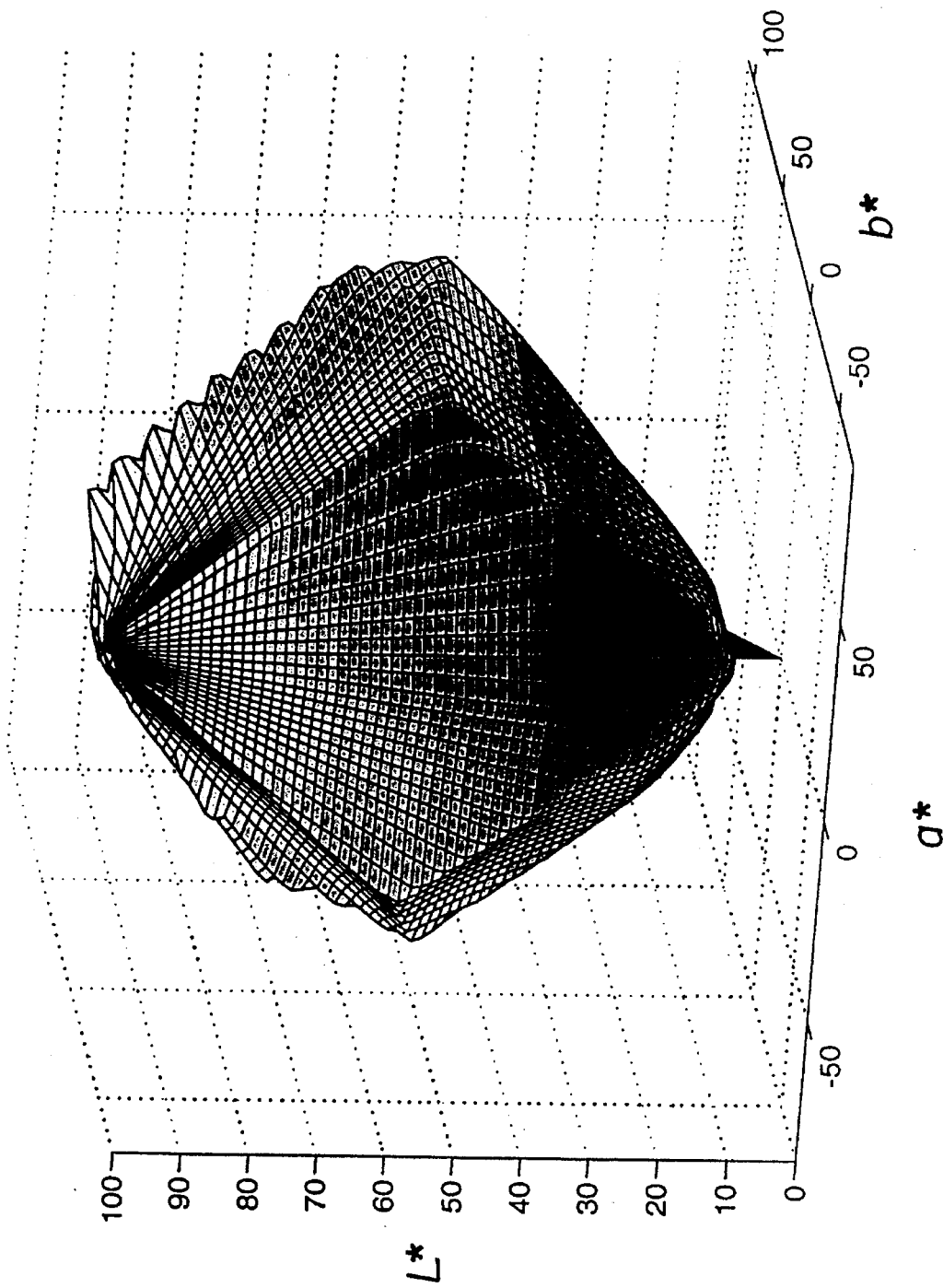
FIG. 6 is a view of a supergaumut in CIELAB color space.

The supergamut is the union of all 6 subgamuts. As shown in FIG. 6, it is a continuous and space-filling volume in color space, free of gross surface deformities or internal voids not swept out by a constituent subgamut. It encompasses all the perceptually significant colors of the 7-ink gamut.

As is quite apparent in FIG. 5, adjacent subgamuts show considerable overlap in color space by virtue of having 2 chromatic inks plus black ink in common. On this L* level, the radial spokes emanating outward from neutral toward the primary inks, represent colors inked solely by black and the respective primary ink. Each spoke is comprised of the abutting gamut surfaces of 2 subgamuts which are displaced by 1 from each other. For example, the spoke to the red ink position is made from the boundary surfaces of the GYRK and RMBK subgamuts. To emphasize the degree of subgamut overlap, it is instructive to point out that all the colors comprising the spoke lie well within the YRMK subgamut.

The relatively good alignment of adjacent subgamut surfaces provides a useful self-consistency check for the integrity of the measurement and modeling steps of the 6 separate characterizations. Forward models derived from color targets which have ink patches in common, ideally should give identical results for colors which map to those common regions of ink space.

Compression

The color compression step maps out-of-gamut colors to printable colors which are within or at the surface of the supergamut. There is no one correct way of doing this. It may depend upon the intended viewing conditions or image type. Of necessity, there will be a trade-off in how much hue, chroma and lightness error is incurred in repositioning a color. The kind of compression employed can depend on image content or application type.

The set of initial colors represent the grid points of the inktable. They are defined by a regularly spaced grid which samples color space over a region just large enough to encompass the gamuts of real-world media. After a tonal mapping is applied, any grid point lying outside the supergamut is mapped to a position on the surface of the supergamut. Grid points originally lying within the supergamut have only a tonal compression applied. The net effect is to ensure that all colors for which an inking is requested can in fact be printed.

Inking

At this point in the inktable construction process, all colors presented to the inktable become printable by virtue of the previous compression step. Given an in-gamut CIE color specification, the goal is to find an inking from the set of 7 available inks which, when printed on paper under specified conditions, is a colorimetric match to that color. A direct solution is not possible since a forward model goes from ink to color. Inversion of the forward model is accomplished by employing optimization or root finding algorithms Success or failure of each inversion try is determined by running the obtained inking through the forward model and comparing the returned color to the target color.

Paired Component Replacement (PCR)

Figure 7A:
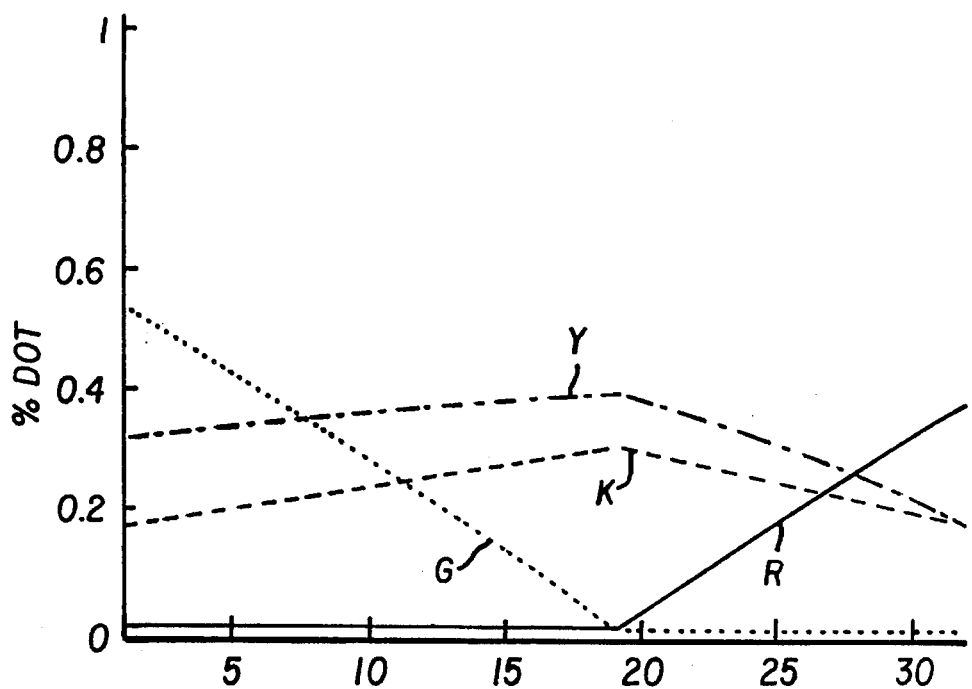
FIGS. 7A, B, C and D show equivalency of dominant ink and black ink with flanking subordinate inks; 32 inkings correspond to points sampled in color space at constant L*=65 at equal intervals. Left plot show points which are wholly within GYRK subgamut (dominant Ink: Yellow); right plot shows points wholly within YRMK subgamut (dominant ink: Red)
Figure 7B:
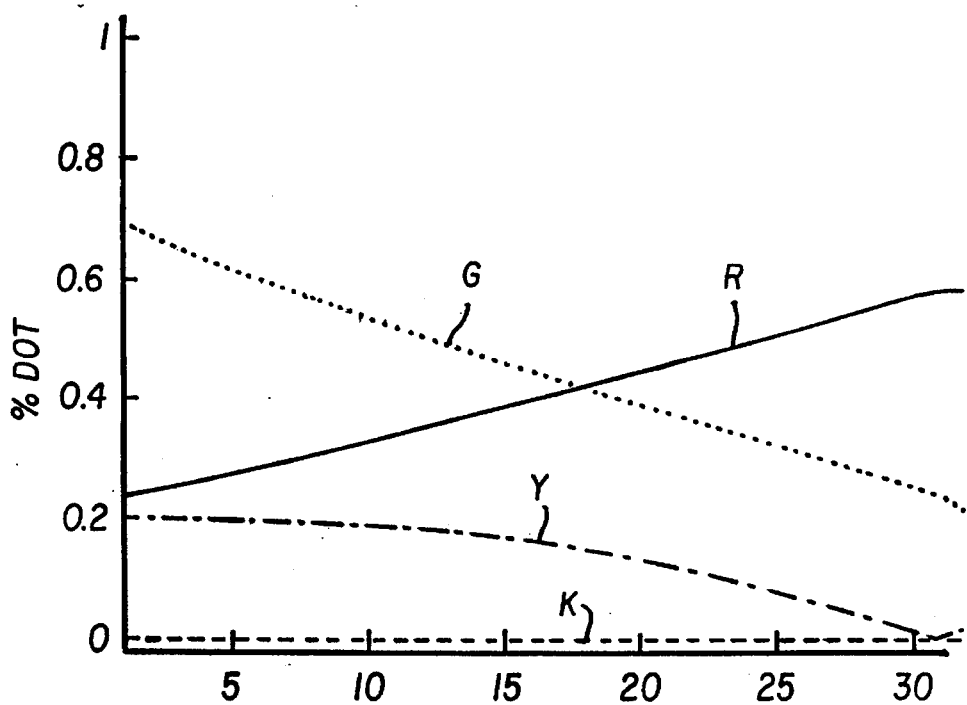
Figure 7C:
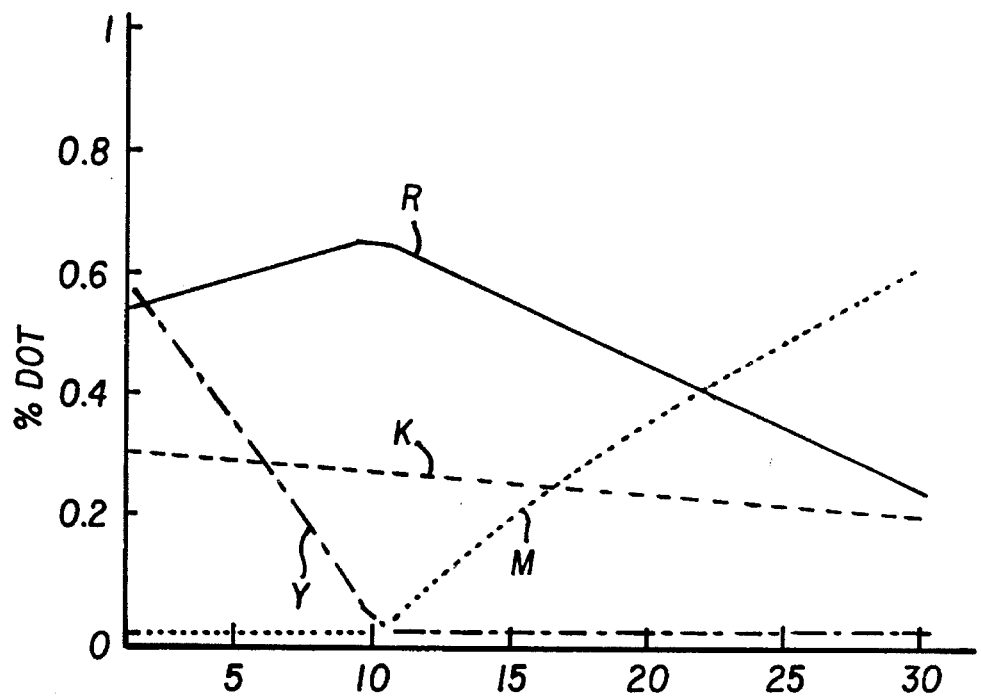
Figure 7D:
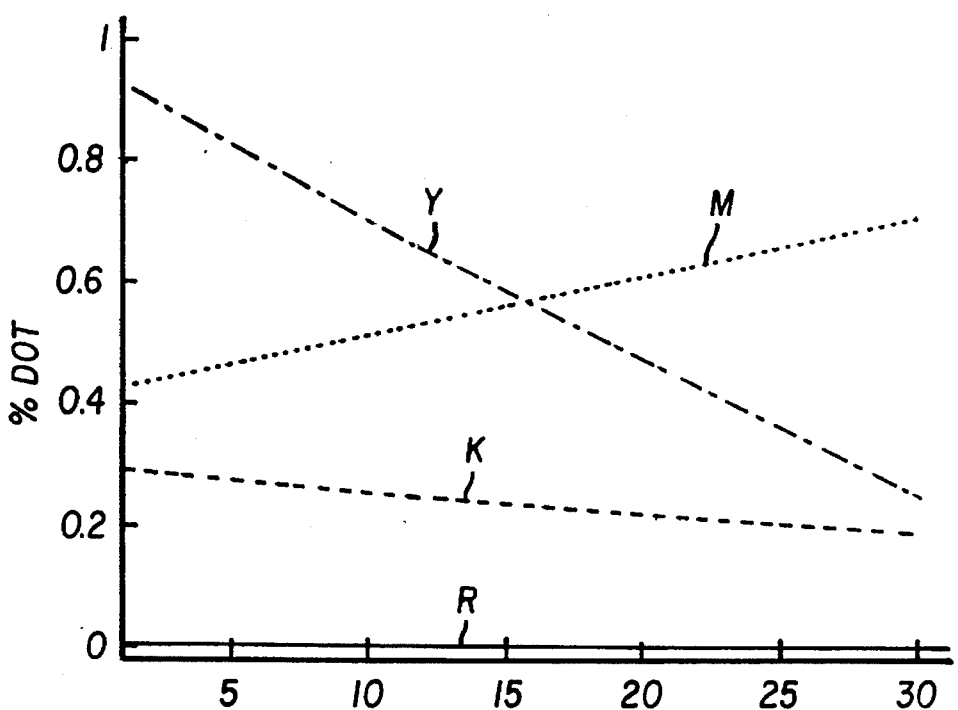

With the traditional CMYK inks, a colorimetric equivalency exists between the CMY inks and black. Typically referred to as gray component replacement (GCR), it means that a given color can be achieved with multiple inkings. In general, a similar phenomenon was observed for all 6 inksets for which the term paired component replacement (PCR) has been coined. For each of the 4-ink groupings, a colorimetric equivalency may exist between the dominant ink and black, on one hand, and the flanking subordinate inks, on the other. Monotonic variation in value of 1 ink pair requires the other pair to vary inversely in order to maintain the same color. In general, for inksets in which the dominant ink is positive (RGB), the flanking negative subordinate inks tend to replace the dominant ink more than black. This is not surprising since the positive primaries are traditionally obtained from overprints of the negative primaries. Conversely, for inksets in which the dominant inking is a negative primary (CMY), the flanking positive subordinate inks largely replace black with relatively small reduction in the dominant negative ink. This behavior can be rationalized by noting that mixtures of the positive primaries tend to produce dark, mud-like colors. FIGS. 7A, B, C and D provide examples of this behavior.

Maximization of Dominant Ink

In conventional 4-ink printing, GCR/UCR (Under Color Removal) specifications serve to constrain the problem to obtain a unique inking. In the present study, it was found that, in all instances, the inking which maximizes the dominant ink of the inkset is the optimal choice for the following reasons:

(a) promotes smooth transition of black ink near neutral; and (b) minimizes the number of inks used in inking a color.

Neutral colors can only be achieved by use of black ink alone; the 3 chromatic primaries in all inksets cannot be mixed in any proportion to obtain a neutral gray. PCR dictates that when the amount of the dominant ink is maximized, so too is black. A maximum black inking thereby results in the smallest black gradient in the neighborhood of neutral which is a desirable characteristic for an inktable. Another desirable characteristic is to ink a color with as few inks as possible. This is precisely the effect when the dominant ink is maximized. From a printability point of view, it is better to ink a light red color with a single red ink than with a colorimetrically equivalent overprint of magenta and yellow inks.

Final Inking

Figure 8A:
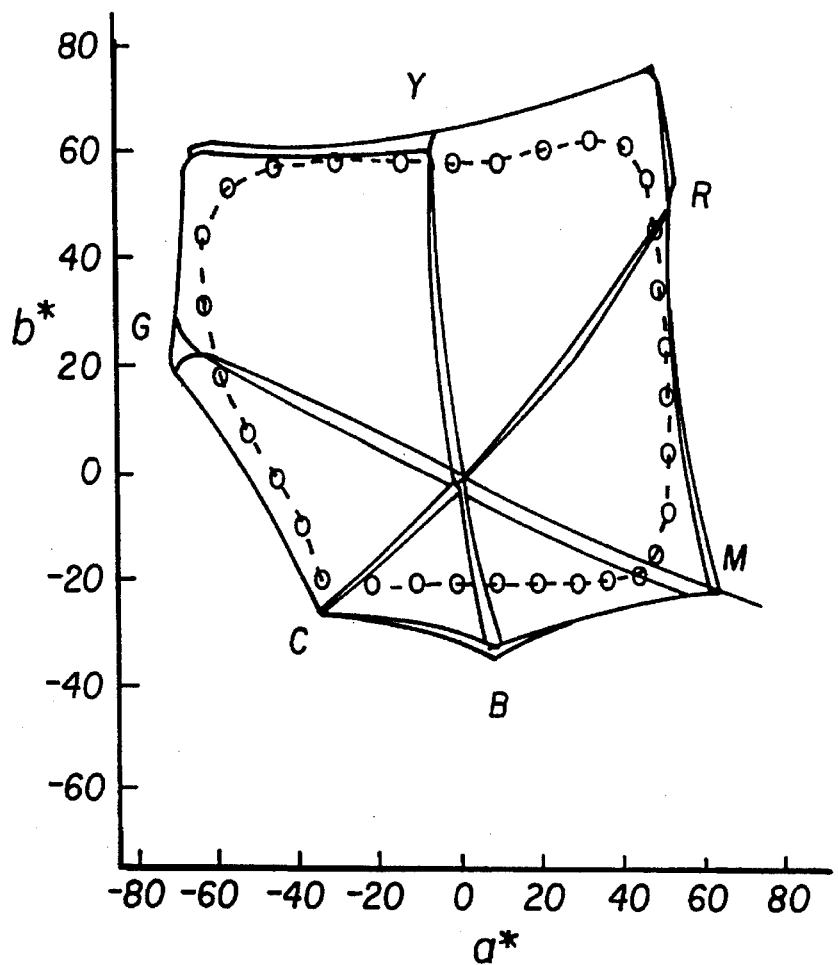
FIGS. 8A, B, C, D, E, F and G show relationships between color and ink for each inkset.
Figure 8B:
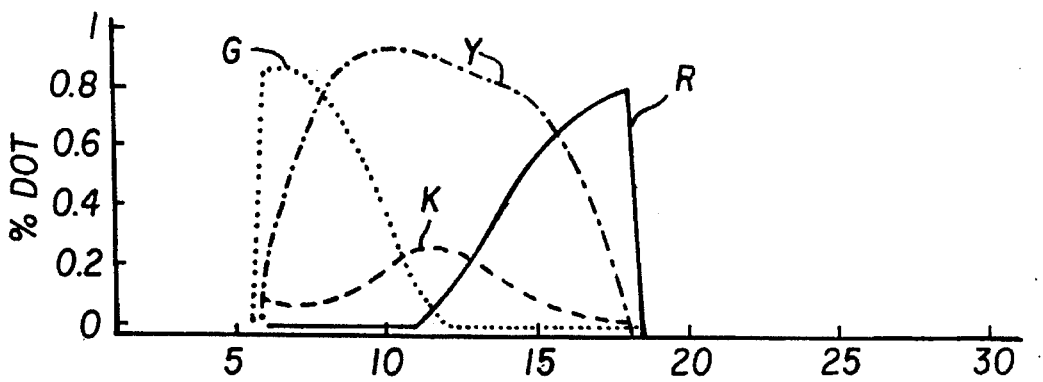
Figure 8C:
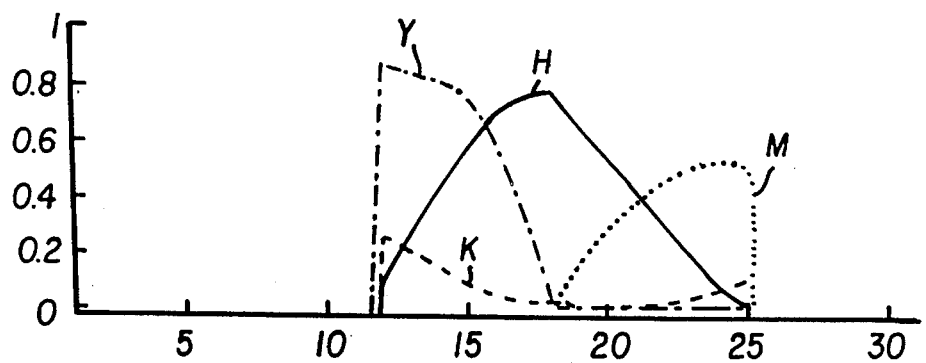
Figure 8D:
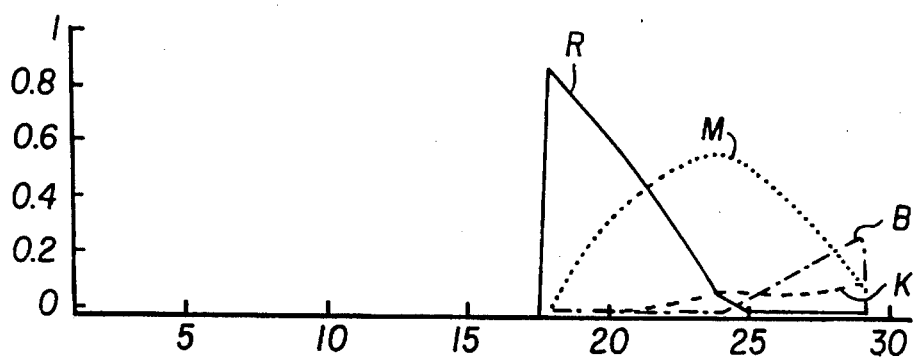
Figure 8E:
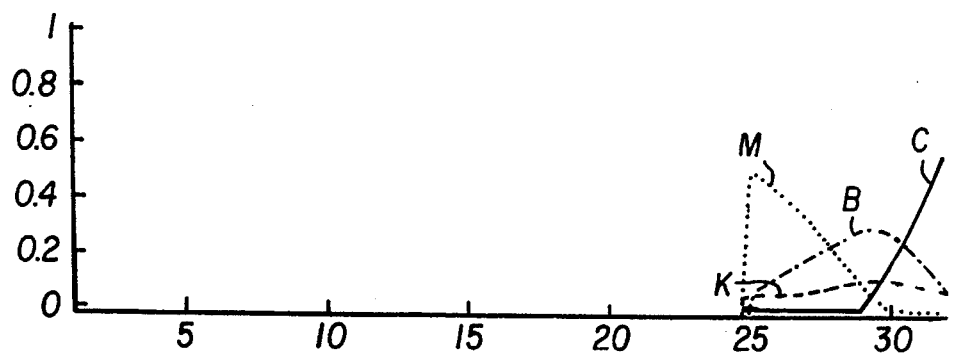
Figure 8F:
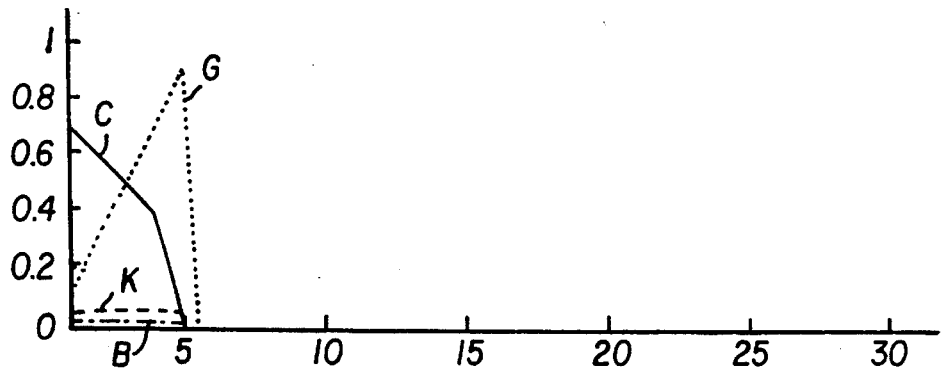
Figure 8G:
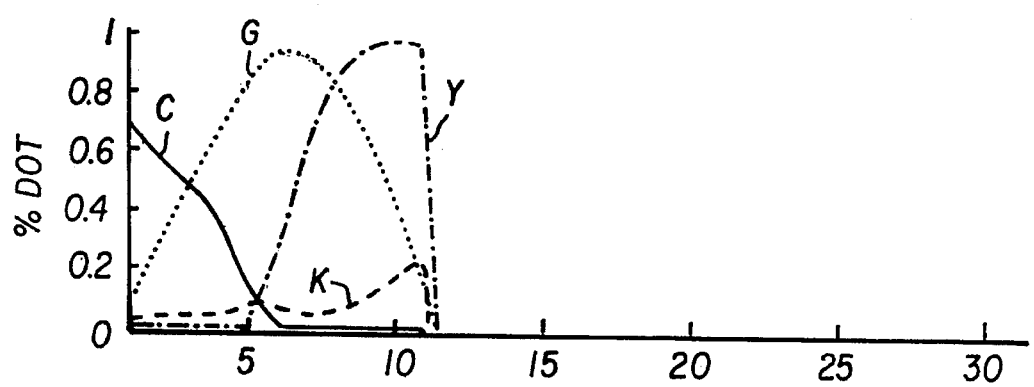
Figure 9A:
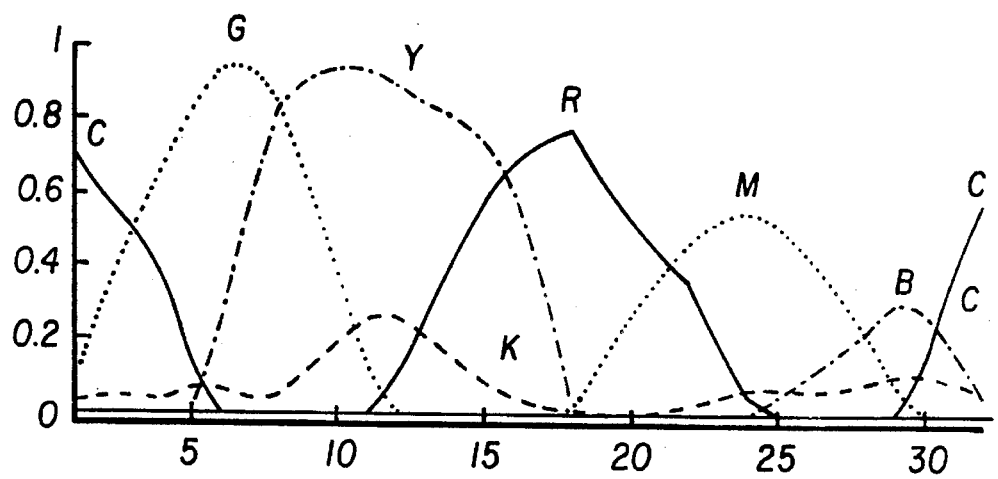
FIG. 9A shows the composite inkings selected from the set of inkings shown in FIGS. 8A through G.
Figure 9B:
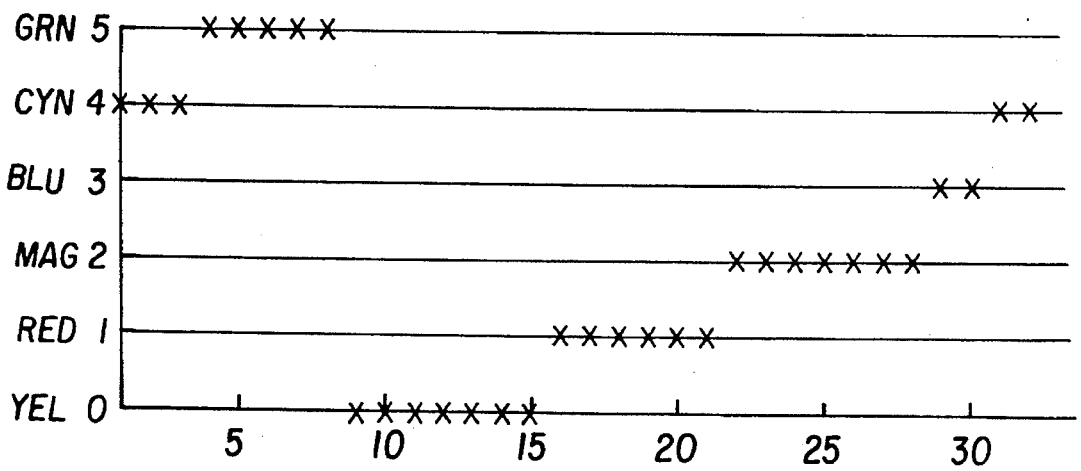
FIG. 9B shows the inkset from which the inkings were derived.

The final step in the inktable construction process is to obtain a single inking for a given color. An attempt is made to invert each of the 6 forward models. Only the inversions of those forward models whose subgamuts contain the color will be successful and yield an inking which is a colorimetric match to that color. Due to the high degree of common ink overlap, however, a given color is usually contained in 2 subgamuts. Hence it becomes necessary to devise a way of obtaining a single inking. One method is to generate a predicted inking based on previous points along the path in color space. That inking among the successful inkings which is the closest match to the predicted inking is selected. Additional weight is given to inkings in which the maximum ink corresponds to the dominant ink of the inkset. FIGS. 8A–G and 9A and 9B illustrate the relationship between color and ink. FIG. 8A shows the path through CIELAB color space at $L^*=65$. The 32 point path starts in the cyan region and proceeds clockwise. The right plot in FIGS. 8B–G shows the inkings derived from inverting each forward model for all 32 points; inversion failures produce no inkings. The abscissa axis corresponds to ordered number of points; ordinate axis is percent dot in ink. FIG. 9A shows the composite inkings selected from the set of inkings shown in FIGS. 8B–G. FIG. 9B shows the forward models of the inksets utilized in generating any given inking in this composite ink plot.

This aspect of overlapping subgamuts, in which more than one forward model can generate a valid inking, bolsters the robustness of the inktable construction process. It is in the nature of optimization algorithms that inversion failures of a forward model will occasionally occur due to non-convergence or convergence to a local minimum. Performing redundant inversion attempts increases the likelihood that a valid inking will be obtained.

4 Inks/Color Optimal

Earlier work done in 7-ink printing has utilized schemes in which a color is inked with no more than 3 inks: a negative ink primary; a positive ink primary; and black ink. From a printability viewpoint, there is much to recommend this arrangement since it avoids moire problems when conventional halftoning techniques are employed. However, the full 7-ink gamut is not being fully exploited with 3 inks in the darker regions. These excluded regions are attainable when 4 inks/color are employed.

Figure 10A:
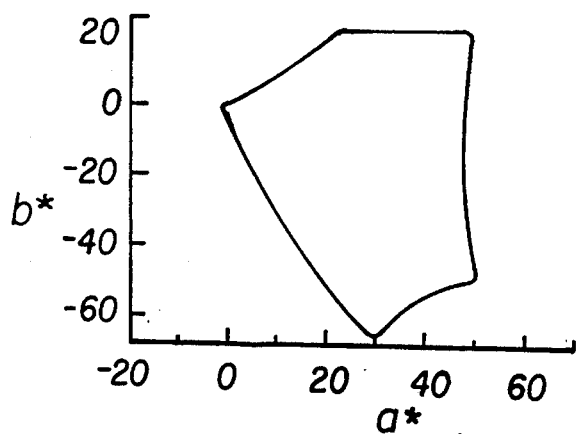
FIGS. 10A, B, C and D Left plots show 3RMBK subgamut at L*=30 plane: top showing gamut at 4-inks/color; bottom shows diminished gamut when inkings constrained to 3-inks/color. Right plot shows inkings of 3RMBK subgamut boundaries; 0-th inking corresponds to neutral at (a*,b*)=(0,0); increasing hue bin number corresponds to counterclockwise movement around gamut boundary.
Figure 10B:
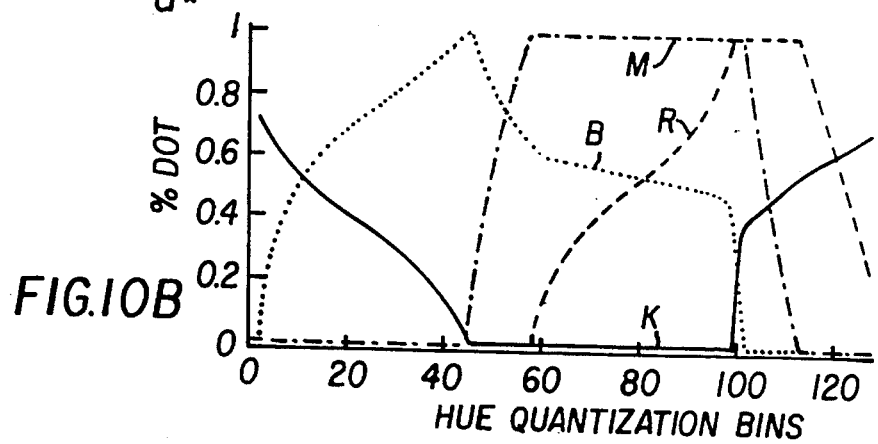
Figure 10C:
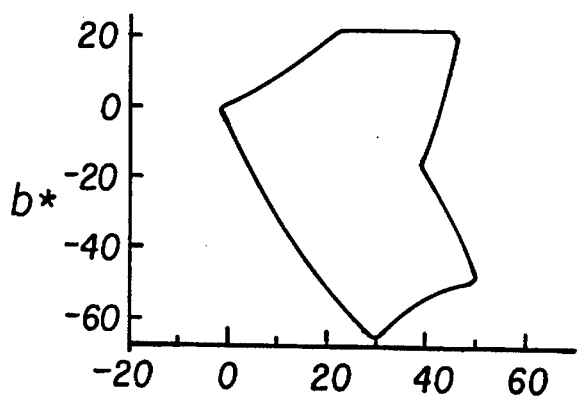
Figure 10D:
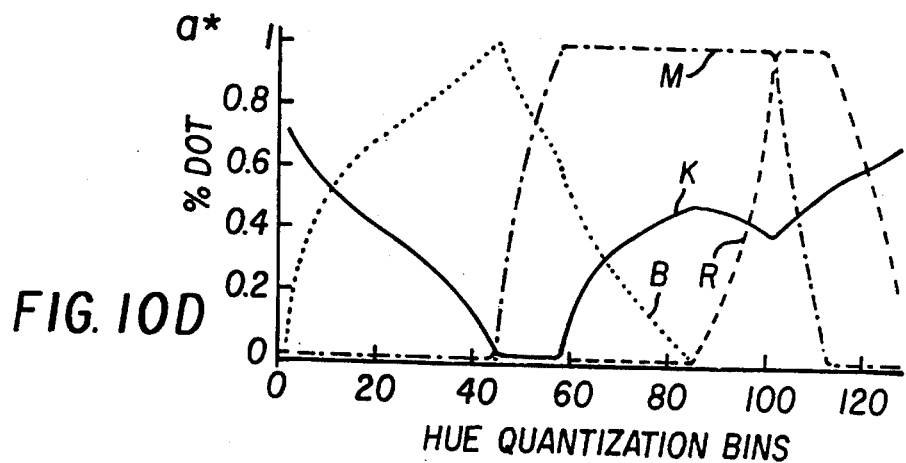

FIGS. 10A and 10C show a cross-section of the 3RMBK subgamut constructed with 4-inks/color and 3-inks/color. FIGS. 10B and 10D respectively show the companion 128 inkings for each quantized color employed in plotting the subgamuts in color space. The 0-th inking corresponds to neutral ($a^*=0$, $b^*=0$) and is only inked with black; successive inkings correspond to traversing the gamut in a counterclockwise direction. Note that where the gamut boundaries coincide, the inkings are identical as one would expect. In the region of the 3-inks/color gamut where scalloping is apparent, the inkings are constrained to black, a positive primary and a negative primary. This same region in the 4-inks/color plot is inked with 3 chromatic inks and no black, and results in a smooth and continuous gamut. By utilizing chromatic primaries to establish a color's $L^*$ value, a concomitant high degree of colorfulness can be attained.

Figure 11A:
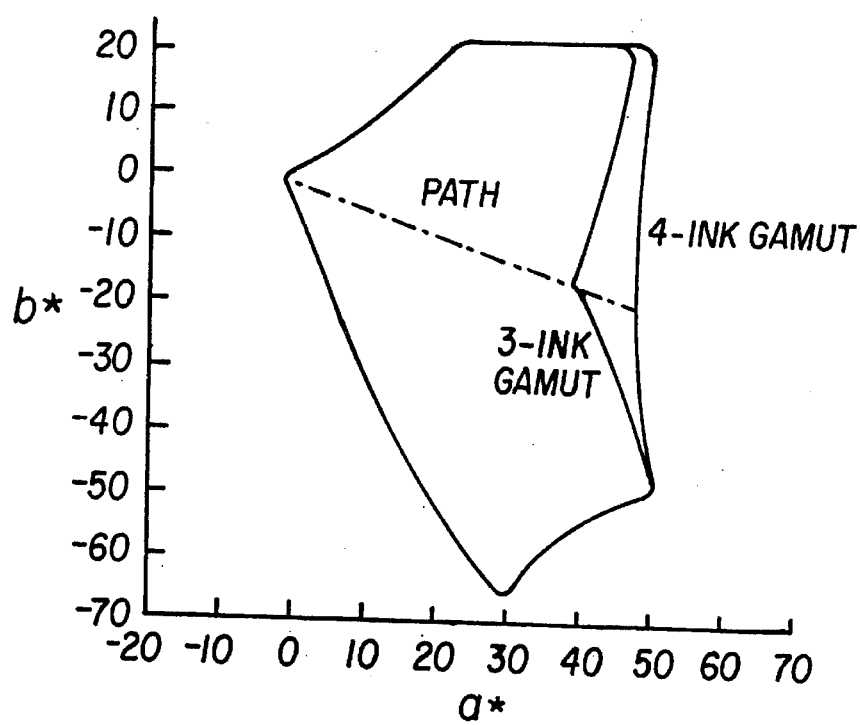
FIGS. 11A and B show inkings of colors along a path which crosses between the 3 inks/color region of gamut to the 4-inks/color region of gamut.
Figure 11B:
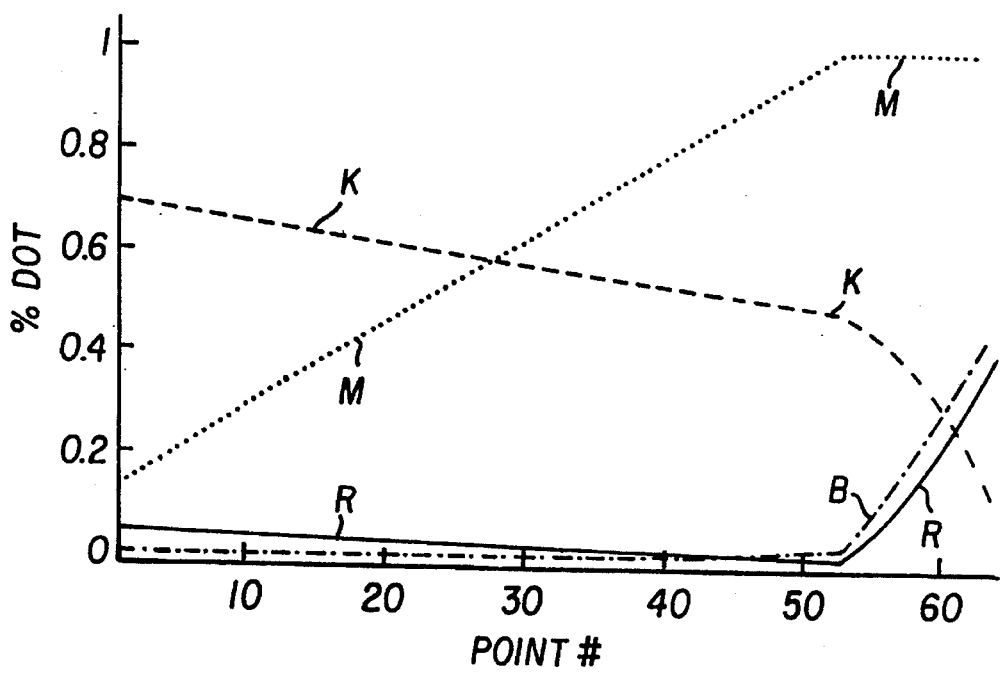

FIGS. 11A and 11B provide another view of how 4-inks/color provides additional gamut access. The path in color space extends from near neutral to the 4-ink gamut boundary. In the companion ink plot on the right, the point at which blue ink is introduced and black ink dips sharply corresponds to the position of the 3-ink boundary in color space. Beyond that point, colors require 4 inks and represent a region of the gamut which is inaccessible to inkings of only 3 inks/color.

Printing

For conventional half-toning methods, cyan, magenta, yellow, and black inks should be printed at their normal screen angles (cyan at 15 degrees, magenta at 75 degrees, yellow at 90 degrees, and black at 45 degrees). The positive red, green, and blue inks should be printed at the same screen angle as their complementary color. We have found that a line ruling of 150 lines per inch for the cyan, magenta, yellow, black, red and green inks and 200 lines per inch for the blue ink results in substantially no visible spatial moiré.

Moiré is not a concern when stochastic rendering schemes are employed.

The problem of constructing a robust inktable based on 7 inks can be made tractable by subdividing them into 6 sets of 4 inks each. Each inkset is then separately characterized.

By utilizing these characterizations individually and in combination, an inktable capable of producing prints of superior color quality can be generated in accordance with the present invention.

Employing the present technique in which colors can be inked with up to 4 inks has advantages with respect to overall efficient gamut utilization and image quality factors compared to schemes employing only 3 inks per color.

The invention has been described in detail with particular reference to a preferred embodiment thereof, but it will be understood that variations and modifications can be effected within the spirit and scope of the invention.

We claim:

1. A process, starting with a specified color in a CIE derived colorspace, for rendering an inking which includes color compression for out-of-gamut colors wherein each color is rendered with a subset of inks selected from a said set of n inks where n is an integer greater than 4; said process comprising the steps of:

subdividing the set n inks into k subsets of ink groupings wherein k is an integer less than n;

any given subset contains $m_j$ integer number of inks selected from a superset of n inks; where the subscript j denotes a particular subset (the j-th subset) in the overall set of k subsets and whose range is: $1 \leq j \leq k$;

characterizing a transformation from inkings to color for each of the k ink subsets; and generate an inking derived from one of the k ink subsets containing $m_j$ inks, such that the inking is a colorimetric match to the specified color for colors within the n ink gamut or represents the closest color in the metric of the input colorspace for colors outside of the n ink color gamut.

2. A process as defined in claim 1 wherein integer n is equal to 7.

3. A process as defined in claim 2 wherein the 7 ink colors are cyan, magenta, yellow, black, red, green, and blue.

4. A process as defined in claim 3 wherein k is equal to 6.

5. A process as defined in claim 4 wherein any term in the integer series $m_j$, where j varies from 1 to k, is equal to 4 or less.

6. A process as defined in claim 5 wherein all terms in the integer series $m_j$, where j varies from 1 to k, are equal to 4.

7. A process as defined in claim 1 wherein the starting color is specified in a CIE-derived color space.

8. A process for constructing a transformation table which accepts as input color values specified in the units of a CIE color space and outputs an inking in $m_j$ inks or less which is derived from a superset of n inks, where $m \leq n$; said table being known as an inktable and said process partitioning the set of n inks into k ink subsets wherein n is an integer greater than 4 and k is an integer less than n and comprising the steps of:

(a) using the $m_j$ inks, generating a multiple-color target for each of the k ink subsets, said multiple-color target being formed of a plurality of color patches;

(b) deriving colorimetric data for each multiple-color target by measuring the color patches;

(c) constructing a plurality of forward models which relates ink-to-color for each of the k ink subsets:

(d) constructing a subgamut from each forward model;

(e) constructing a supergamut from the union of all subgamuts;

(f) define positions of inktable gridpoints in region of a predetermined colorspace;

(g) compressing out-of-gamut gridpoints to the supergamut to thereby map out-of-gamut colors to printable colors which are within or at the surface of the supergamut;

(h) for a given color, attempting to invert the forward model of all k ink subsets in order to obtain an inking;

(i) obtain a predicted inking from previous points on path in colorspace; and (j) select final inking which represent the closest match to the predicted inking.

9. A process as defined in claim 8 wherein the integer m is equal to 4, including 3 chromatic primary colors and black.

10. A process as defined in claim 9 wherein k=6 and $m_j$=4 for all j where j varies from 1 to 6.

11. A process as defined in claim 8 in which there are 6 ink subsets which consist of the following ink groupings: GYRK, YRMK, RMBK, MBCK, BCGK, and CGYK.

12. A process as defined in claim 8 wherein the patches of each multiple-color target represent the $m_j$ inks varying in value in equal increments over a normalized range of 0 to 1.

13. A process as defined in claim 8 wherein the step of deriving colorimetric data of each multiple-color target includes the step of determining CIE color values of each multiple-color target and pairing it with the associated inking command value.

14. A process as defined in claim 13 wherein each forward model is mathematically constructed by fitting the coefficients of a high order polynomial employing a least squares criterion to data.

15. A process as defined in claim 11 wherein any one of the 6 ink subsets represents a subgamut of the overall 6 ink super gamut represents that region of a color space which is swept out by the associated forward model when all combinations of its $m_j$ inks are considered, whereby each subgamut:

(i) is a portion of the overall n-ink gamut; and (ii) differs from adjacent subgamuts by only 1 ink.

16. A process as defined in claim 15 wherein the step of compressing out-of-gamut colors to the supergamut includes:

(a) defining a regular grid of points which sample color space over a region large enough to encompass substantially all possible colors encountered; and (b) mapping any grid point lying outside the supergamut to a position on the surface of the supergamut, whereby all specified colors can in fact be printed.

17. A process in which the inking obtained as specified in claim 1 represents a maximum black or minimum black inking for a given inputted color.

* * * * *